United States Patent [19]

Wrasidlo

[11] 3,951,815

[45] Apr. 20, 1976

[54] COMPOSITE SEMIPERMEABLE MEMBRANES MADE FROM POLYETHYLENIMINE

[75] Inventor: Wolfgang J. Wrasidlo, La Mesa, Calif.

[73] Assignee: Universal Oil Products Company, Des Plaines, Ill.

[22] Filed: Sept. 5, 1974

[21] Appl. No.: 503,400

[52] U.S. Cl.................. 210/500 M; 260/2 EN; 260/2.5 AY; 260/898; 260/823; 260/79.3 R; 260/77.5 CH; 260/78 SC; 260/78 TF; 528/273; 528/288; 528/367; 528/422
[51] Int. Cl.$^2$................ B01D 39/00; B01D 31/00
[58] Field of Search......... 210/23, 321, 490, 500 M; 204/296; 427/245; 428/333, 474; 260/2 EN, 2.5 AY, 78.4 D, 898, 823, 79.3 R, 77.5 CH, 78 SC, 78 TF

[56] References Cited

UNITED STATES PATENTS

| | | | |
|---|---|---|---|
| 3,276,598 | 10/1966 | Michaels | 204/296 |
| 3,377,190 | 4/1968 | Bagoley | 427/245 |
| 3,423,278 | 1/1969 | Hodgdon | 204/296 |
| 3,472,766 | 10/1969 | Rosenbaum | 210/23 |
| 3,536,646 | 10/1970 | Hatch | 210/23 |
| 3,554,379 | 1/1971 | Pye | 210/321 |
| 3,579,288 | 5/1971 | Suszer | 204/296 |
| 3,714,010 | 1/1973 | Suszer | 204/301 |
| 3,719,640 | 3/1973 | Lee | 210/321 |
| 3,775,308 | 11/1973 | Yasuda | 204/296 |
| 3,795,635 | 3/1974 | Marze | 204/296 |
| 3,816,303 | 6/1974 | Wrasidlo | 210/23 |
| 3,822,202 | 7/1974 | Hoehn | 210/23 |
| 3,835,207 | 9/1974 | Frost | 210/500 |
| 3,857,782 | 12/1974 | Crowley | 210/500 M |

*Primary Examiner*—Frank A. Spear, Jr.
*Assistant Examiner*—Ernest G. Therkorn
*Attorney, Agent, or Firm*—Fitch, Even, Tabin & Luedeka

[57] ABSTRACT

Composite semipermeable membranes are made by reacting a film-forming polymer with a cross-linking monomer to form a polymeric ultrathin film having semipermeable properties. During the formation, a grafting reaction is carried out at reactive sites so there are few remaining active sites where oxidizing attack or fouling can potentially occur. One composite membrane comprises a microporous substrate and an ultrathin polyamide film formed of polyethylenimine cross-linked with a monomer, such as an acyl halide, a chloroformate, an isocyanate or a sulfonyl chloride. Grafted onto the cross-linked polyethyleneimine at what would otherwise be secondary amido sites is an epoxide, an aldehyde, an anhydride or a reactive ethylene compound.

14 Claims, No Drawings

COMPOSITE SEMIPERMEABLE MEMBRANES MADE FROM POLYETHYLENIMINE

This invention relates to semipermeable membranes.

Various semipermeable membranes are commercially used today for performing separations by reverse osmosis and ultrafiltration. These membranes include the early Loeb-type membranes made of cellulose diacetate by processes described in U.S. Pat. Nos. 3,133,132 and 3,133,137. The Loeb-type membranes are the asymmetric type which are characterized by a very thin, dense surface layer or skin that is supported upon an integrally attached, much thicker, supporting layer. Somewhat more recently, processes have been developed for making an ultrathin film or skin separately from a porous supporting layer, and membranes made in such manner have become known as composite membranes. In composite membranes, it becomes possible to tailor both the skin and the porous supporting layer to individually have the most desirable properties.

The book Condensation Polymers, by Paul W. Morgan, Interscience Publishers, 1965, teaches interfacial condensation as one method of making a thin film polymer from reacting monomers. Interfacial condensation provides one method for making reverse osmosis membranes of the composite membrane type, see for example, U.S. Pat. No. 3,744,642, issued July 10, 1973.

Investigations have recently been carried out as in respect of creating ultrathin membranes by reactions between polyfunctional amines and monomeric reactants, such as diacyl halides and disulfonyl halides, to form polyamides or polysulfonamides. There is also interest in reacting poly-functional amines with bis-chloroformates or with diisocyanates to form polyurethanes or polyureas. Various membranes produced by such reactions have shown a capability for good salt rejection while exhibiting water flux of varying degrees.

In the treatment of brackish water, and particularly in the treatment of waste effluent, it is often necessary to treat the feed material with chlorine or other oxidizing agents so as to guard against bacteria growth which could greatly deter the performance of the membranes as a result of fouling or the like. However, it has also been found that the inclusion of chlorine in the feed to semipermeable membranes results in substantial deterioration in the performance of the membrane. Membranes for reverse osmosis separation operations are desired which have increased resistance to fouling and deterioration.

It is an object of the present invention to provide improved composite semipermeable membranes. Another object is to provide an improved method for making composite semipermeable membranes having good salt rejection characteristics which membranes are resistant to deterioration. A further object of the invention is to provide a composite semipermeable membrane exhibiting commercially feasible salt-rejection performance and water flux which membrane will retain such performance although used with a chlorine-treated feed. These and other objects of the invention will be apparent from a reading of the following detailed description of processes for making composite semi-permeable membranes embodying various features of the invention.

By employing a film-forming polymer having a plurality of reactive amino or hydroxyl groups, for example, and by treating this polymer with a monomer which will cross-link the polymer, rather than react with two groups on the same molecule, ultrathin films can be created which have effective salt-rejecting capability and which films are thus useful in the creation of composite semipermeable membranes. In this respect, particularly good semipermeable properties are displayed by ultrathin films created from a fairly highly branched polyamine, i.e., one having a substantial percentage, at least about 15 percent, of its amino groups present as branches to the main chain of the molecule. However, the amino groups constituting these branch chains are usually primary amino groups; and as a result, when the cross-linking reaction takes place, these primary amino groups form secondary amides, sulfonamides, or the like, depending upon the particular reaction. Although good salt-rejection properties may be initially exhibited, when such ultrathin membranes are used with a chlorine-treated feed, degradation of these properties occurs. It is believed that the hydrogen atom attached to the secondary amido group is subject to oxidation attack by the hypochlorite ion and that this attack results in the gradual opening up of the otherwise tight, cross-linked molecular structure of the ultrathin film to an extent where its salt-rejection capability begins to decrease. Moreover, these secondary amido sites are hydrophilic and are considered to attract heavy metal ions and to be conducive to complexing and thereby contribute to fouling. If a polymer such as polyvinyl alcohol is used, the unreacted hydroxyl sites are considered to function similarly.

It has been found that, by treating the polyamine with a suitable reactant that will minimize the number of secondary amido groups in the ultimate semipermeable membrane, a membrane is created that is substantially more resistant to fouling and degradation. This grafting reaction can be carried out either before or after the polyamine is cross-linked. If the reaction occurs before cross-linking, a reactant is used that is highly selective to react only with the primary amino group and change it to a secondary amino group. The preferred addition reactant is acrylonitrile, which results in the cyanoethylation of the primary amino branch chains. However, other ethylene compounds which are reactive with primary amines can also be used, as well as epoxides, aldehydes and anhydrides, for example, phthalic anhydride. Polyfunctional amines, treated in this manner, form ultrathin films that are resistant to fouling and oxidation. Moreover, cyanoethylated branch chains exhibit excellent compatability with the basic molecular structure of a polyethylenimine copolymer, with the result that a copolymeric semipermeable membrane exhibiting good salt-rejection properties is created.

The ultrathin film can be formed in situ upon a microporous substrate or it can be formed separately, as by a floatation-deposition method. For in situ formation, the pores in the surface of the microporous substrate are preferably sized between about 100A. and about 1000A; however, depending upon the circumstances of the formulation and the use of the composite membrane, surface pores ranging in size between about 50A. and about 5000A. may be acceptable. U.S. Pat. No. 3,676,203, issued July 11, 1972, the disclosure of which is incorporated herein by reference, indicates that various commercially available materials, such as Millipore filters (types VS and VM) may be used as microporous substrates in making composite membranes. This patent also indicates that suitable microporous substrates may be cast from homopolymers or from mixed polymers of cellulose acetate (CA), polysulfone, cellulose butyrate, cellulose nitrate (CN), polystyrene and the like, and it describes a casting process for making suitable microporous substrates from a CA-CN mixture.

The preferred polyamine is polyethylenimine having a molecular weight between about 40,000 and 60,000, which is water-soluble; however, other polyethylenimines having molecular weights in the range between about 2,000 and about 100,000 may also be employed. As previously indicated, the polyethylenimine preferably also has at least about 15 percent of its aminoethylene moieties present as branches to the main chain of the molecule. Polyethylenimine is commercially available in highly branched form and in a variety of molecular weights as a product of the polymerization of ethylenimine.

Polyethylenimine can be readily reacted with certain di- and tri- functional monomers, e.g. triacyl and diacyl halides, sulfonyl halides, bischloroformates and diisocyanates to form cross-linked copolymers in the form of ultrathin films having good salt-rejecting properties. The monomer should have a far greater propensity to react with two amino groups from different polymer chains so as to achieve the desired cross-linking, as opposed to reacting with two amino groups on the same molecule. Of the diacyl halides, diacyl chlorides are readily commercially available and are preferred, and the aromatics are preferred because they appear to produce ultrathin films having superior salt-rejection capabilities to those produced using aliphatic diacyl halides. However, some diacyl aliphatic halides, such as sebacoyl chloride, produce ultrathin films having properties approaching those of the aromatics and may be employed. The preferred diacyl halides are isophthaloyl and terephthaloyl chlorides.

If an interfacial condensation reaction is used, the reactants may be dissolved in solvents that are substantially immiscible with each other. Polyethylenimine and polyvinylalcohol are water-soluble and can advantageously be employed in aqueous solution. Instead of using interfacial condensation, the monomer may be applied directly, e.g., possibly in the vapor phase or as a solution in a solvent miscible with water, such as dioxane or tetrahydrofuran; however, most consistent results have been obtained by applying the diacyl halide dissolved in an organic carrier that is substantially immiscible with water as a part of an interfacial condensation reaction.

When polyethylenimine is used, it may first be reacted with an appropriate amount of acrylonitrile under conditions which assure cyanoethylation of substantially all of the primary amino groups or the polyethylenimine may first be cross-linked and then reacted with acrylonitrile or a suitable reactant. This is a standard graft polymerization reaction and is carried out under known conditions. Once the reaction begins, it proceeds exothermically. If the reaction is carried out initially, the resultant graft polymer is also water soluble, and the cross-linking reaction is carried out in the usual manner. A sufficient amount of acrylonitrile should be provided to react with the calculated amount of primary amino groups present in the polymer, and generally a slight excess of acrylonitrile is provided to assure that substantially all of the primary amino groups have been cyanoethylated.

After the cyanoethylation is complete, an appropriate water solution of the graft polymer, for example, approximately 2 percent, is prepared, and a microporous substrate is soaked in this solution for a sufficient period of time that it penetrates therethrough, for example, about 15 minutes. The microporous substrate is then removed, drained and appropriately air-dried in a circulating-air oven, e.g., for about 30 minutes. Thereafter, the dried microporous substrate is again briefly immersed into the aqueous solution, drained for about 1½ minutes and then treated with the monomer, as for example by dipping into a suitable solution or by coating therewith.

The reaction of the polyamine with the diacyl halide, or some other monomer, is allowed to proceed for an appropriate period of time to assure that cross-linking to the extent desirable is achieved. Two variables which play a major role in determining the thickness of the resultant ultrathin film in an interfacial condensation reaction are the concentration of the monomer at the interface and the time interval of contact between the organic phase and the aqueous phase. For example, when isophthaloyl chloride is employed in an interfacial condensation reaction to produce a polyamide membrane, a 0.4 to 0.8 weight percent solution in hexane may be used. Using solutions of these approximate weight percentages, the time of treatment will generally be about 15 seconds. It should be understood that time is appropriately adjusted depending upon the weight percentages, inasmuch as the parameters of time and concentration are co-variable.

When a film-forming polymer such as polyvinylalcohol, is used which has reactive groups of all the same type, the graft reaction is preferably carried out after cross-linking so as to remove the potentially reactive sites provided by the unreacted hydroxyl groups. Cross-linking may be achieved using known di- or trifunctional monomers, for example, di- or triacyl halides, diisocyanates and difunctional reactive ethylene compounds, such as dicyanobutadiene. Any suitable reactant that will react with the hydroxyl groups may be used, for example, an acid halide, an isocyanate, or an epoxide.

The following examples set forth certain preferred techniques for preparing composite semipermeable membranes. However, it should be understood that these examples do not constitute limitations upon the scope of the invention which is defined solely by the claims appended hereto.

EXAMPLE I

A three-necked, round bottom flask is fitted with a condenser, a stirrer, and an addition funnel is charged with 100 grams of Tydex-12 (Dow Chemical), an aqueous solution containing about 33 grams of polyethylenimine having an average molecular weight of about 50,000 and having about 25 percent of its aminoethylene moieties present as branches to the main chain. About 100 milliliters of water are added, and stirring is carried out while 12.6 grams of acrylonitrile are added dropwise over a period of about 1 hour. This calculates to about 0.27 mole of acrylonitrile per each mole of aminoethylene moiety, i.e., a slight excess over stoichiometric. A sharp exothermic reaction occurs, and stirring is continued throughout the acrylonitrile addition.

Tightly woven dacron cloth (Texlon, Inc. D-714) is disposed upon a glass plate. A solution containing 12.5 weight percent polysulfone, 12.5 weight percent methyl-cellusolve and the remainder dimethyl formamide is cast in a layer about 0.02 inch thick upon the cloth. The polysulfone layer is gelled in a room-temperature water bath, and the resultant fiber-reinforced porous polysulfone substrate has an overall thickness of about 0.06 inch, with the portion of the porous polysulfone layer that lies atop the dacron cloth having a thickness of about 0.025 inch. The polysulfone layer is examined and is seen to have a finely porous upper surface replete with numerous small pores between about 50A. and 600A. in size. Such pores are considered capable of supporting an ultrathin semipermeable film without having the film collapse into the pores under pressure.

The fabric-reinforced polysulfone substrate is pre-soaked for about thirty minutes in the previously prepared cyanoethylated polyethylenimine aqueous solution which has been further diluted to about 2 weight percent, and it is then removed and drained. Following air-drying for about 15 minutes, the pre-soaked polysulfone substrate is disposed upon a glass plate, and the plate-mounted substrate is immersed again in the aqueous solution for about 20 seconds in order to wet the previously dried upper surface. The re-wetted membrane is allowed to drain for about two minutes, and it is then immersed into a hexane solution containing about 0.8 weight percent of isophthaloyl chloride. After about fifteen seconds in this solution, it is removed, drained and then placed in a forced-air oven, pre-heated to about 105°C., for a period of about ten minutes.

Samples of composite polyamide membranes made by this procedure are tested using a 3.5 weight percent aqueous solution of sodium chloride at 1000 p.s.i., 25°C. and a pH of 5.6 to 6.0 and are found to initially exhibit a salt-rejection of about 99.6 percent and a water flux of about 13 gallons per square foot per day (G.F.D.).

At the same time, testing is carried out with a composite polyamide membrane produced from polyethylenimine and isophthaloyl chloride under exactly the same conditions as set forth above, with the exception that the Tydex-12 polyethylenimine is not cyanoethylated. This composite membrane exhibits an initial salt rejection of about 99 percent and a water flux of about 22 G.F.D. Thus, cyanoethylation which takes place is considered to be reflected by a substantial decrease in the water flux through the resultant membrane, whereas the salt-rejection of both membranes is about equal.

Treatment of both membranes under these feed conditions is continued, and readings are subsequently taken every 6 to 8 hours. After 43 hours, testing shows that the non-cyanoethylated membrane exhibits a water flux of about 22.5 G.F.D. and a salt rejection of still about 99 percent. At the same time, the cyanoethylated membrane now exhibits a water flux of about 12.5 G.F.D. and a salt rejection of about 99.5 percent.

Thereafter, additional samples of both composite membranes are tested with about 5 p.p.m. of $Cl_2$ being added to the feed supply, and readings are taken periodically. There is only a very gradual decline in the salt-rejection exhibited by the membrane made by the process first set forth above. Thus, the membrane is considered to be excellently suited for use with a feed solution containing an oxidizing component. Meanwhile testing shows that the non-cyanoethylated membrane exhibits substantially increasing water flux which reaches about 31 G.F.D. following a period of about 125 hours. At the same time, the salt rejection decreases from about 99 percent to about 93 percent. This decrease is considered to reflect an attack upon the chemical structure of the copolymer by the hypochlorite ion.

EXAMPLE II

Additional samples of the composite membrane are made in accordance with the method of Example I, but without cyanoethylating the polyethylenimine. After immersion in the hexane solution and draining, the ultrathin film on the polysulfone substrate is dried at 105°C. for 10 minutes and is thereafter cyanoethylated by treatment with a 5 weight percent solution of acrylonitrile in water and exposure thereto for about 30 minutes at about 25°C. Subsequent to this cyanoethylation treatment, the composite membrane is placed in a forced air oven where it is heated for about ten minutes at 105°C.

Testing of the samples under the conditions used in Example I shows that they exhibit an initial salt rejection of about 99.5 percent and a water flux of about 13 G.F.D. Testing of this membrane with the chlorinated feed shows that it exhibits resistance to oxidation equal to that of the composite membrane made in Example I, wherein the polyethylenimine was cyanoethylated prior to crosslinking.

EXAMPLE III

The process of Example II is repeated; however, instead of treating the ultrathin film with an acrylonitrile solution, it is treated with a 2 weight percent solution of epichlorohydrin in water. The treatment is carried out for 30 minutes at 25°C., and the treated composite membrane is then dried in a forced-air oven at about 105°C. for about 10 minutes.

Testing of the membrane shows that it initially exhibits a salt rejection of about 99.50 percent and a water flux of about 23.0 G.F.D. Subsequent testing with a chlorinated feed in accordance with the procedure set forth in Example I shows that the membrane exhibits resistance to oxidation equal to that of the membranes made by the processes set forth in Examples I and II.

EXAMPLE IV

The process of Example I is repeated except that, instead of using cyanoethylated polyethylenimine, a 2 weight percent solution of polyvinyl alcohol, having molecular weight between about 100,000 and about 500,000, in water is used. Crosslinking is similarly carried out using the same isophthaloyl chloride solution, draining and drying in a forced-air oven for about 10 minutes at 90°C.

Samples of the membranes made by this procedure are tested under conditions set forth in Example I and are shown to exhibit a salt rejection of about 95 percent and a flux of 25 G.F.D.

Additional samples, before drying, are treated with a 2 weight percent solution of epichlorohydrin in water for about 30 minutes at 25°C., and using 0.05 weight percent diethylenetriamine as an initiator, which conditions are sufficient to epoxidize substantially all of the remaining unreacted hydroxyl groups in the crosslinked polyvinyl alcohol film. Tthe epoxidized composite membrane is then dried at 90°C. for about 10 minutes and tested under the same conditions as above. Similar salt rejection and flux are obtained. Subsequently, testing with the chlorinated feed solution as set forth under the conditions of Example I is carried out. The crosslinked epoxidized semipermeable membrane is found to exhibit excellent resistance to the oxidizing condition of this feed, whereas the non-epoxidized membrane shows a gradual decrease in its salt rejection performance.

Various modifications may be made to the procedures described herein as would be obvious to one having the ordinary skill in the art, and such modifications are considered to be included within the scope of the invention which is defined by the claims appended hereto.

Various of the features of the invention are set forth in the claims which follow.

What is claimed is:

1. A composite semipermeable membrane which comprises a microporous substrate and an ultrathin film formed of a crosslinked, grafted polyethylenimine having semipermeable properties disposed on one surface of said microporous substrate, said ultrathin film being formed of polyethylenimine that has been crosslinked with a di- or tri-functional compound selected from the group consisting of acyl halides, chloroformates, isocyanates and sulfonyl chlorides, said crosslinked polyethylenimine also having grafted thereonto, at what would otherwise be secondary amido sites, a graft reactant selected from the group consisting of acrylonitrile, epichlorohydrin and phthalic anhydride.

2. A membrane in accordance with claim 1 wherein said crosslinking compound is a diacyl or triacyl aromatic halide.

3. A membrane in accordance with claim 1 wherein said cross-linking compound is isophthaloyl chloride or terephtaloyl chloride.

4. A membrane in accordance with claim 3 wherein said graft reactant is acrylonitrile.

5. A membrane in accordance with claim 4 wherein said cross-linking compound is isophthaloyl chloride.

6. A membrane in accordance with claim 3 wherein said graft reactant is epichlorohydrin.

7. A composite semipermeable membrane in accordance with claim 1 wherein said ultrathin film has a thickness of at least about 250°A.

8. A composite semipermeable membrane in accordance with claim 3 wherein said polyethylenimine contains at least about 15 percent of its aninoethylene moieties as branches to the main molecular chain.

9. A membrane in accordance with claim 8 wherein said polyethylenimine has a molecular weight between about 40,000 and 60,000.

10. A composite semipermeable membrane which comprises a microporous substrate and an ultrathin film at least about 250°A thick formed of a crosslinked, grafted polyethylenimine having semipermeable properties disposed on one surface of said microporous substrate, said ultrathin film being formed of polyethylenimine that has been crosslinked with isophthaloyl chloride or terephtaloyl chloride, said crosslinked polyethylenimine also having acrylonitrile or epichlorohydrin grafted thereonto, at what would otherwise be secondary amido sites.

11. A membrane in accordance with claim 10 wherein said graft reactant is acrylonitrile.

12. A membrane in accordance with claim 10 wherein said graft reactant is epichlorohydrin.

13. A composite semipermeable membrane in accordance with claim 10 wherein said polyethylenimine contains at least about 15 percent of its aminoethylene moieties as branches to the main molecular chain.

14. A membrane in accordance with claim 13 wherein said polyethylenimine has a molecular weight between about 40,000 and 60,000.

* * * * *